April 12, 1960   C. H. HOLMES   2,932,538
MAGNETIC RETRIEVER
Filed April 7, 1959
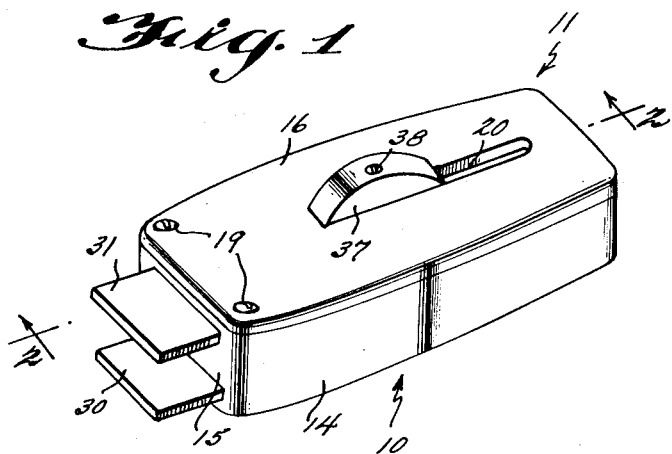
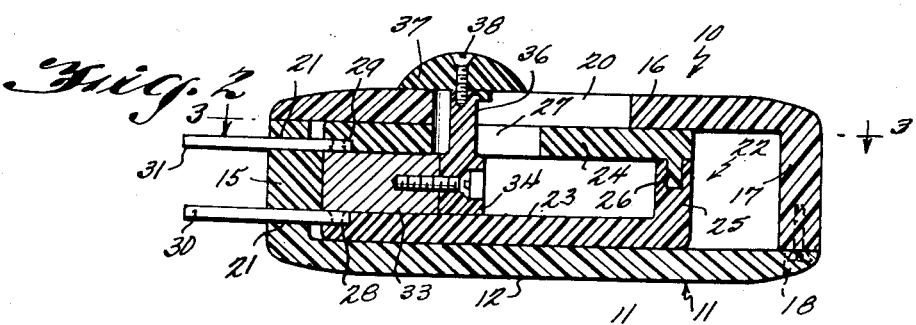
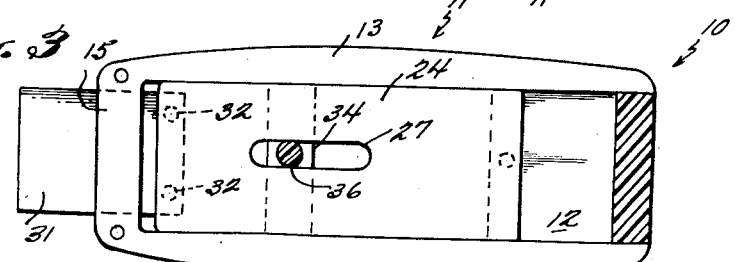
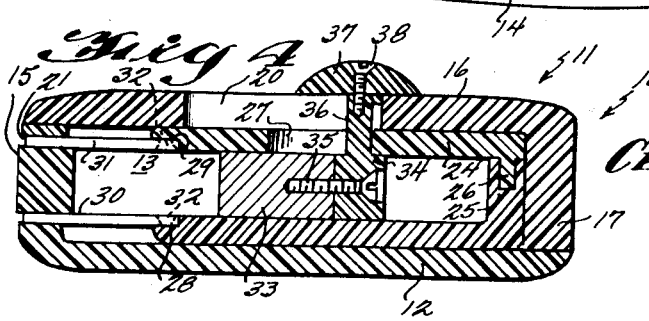
Inventor
CHARLES H. HOLMES
Kimmel & Crowell
ATTORNEYS

United States Patent Office 2,932,538
Patented Apr. 12, 1960

2,932,538

MAGNETIC RETRIEVER

Charles H. Holmes, Fort Wayne, Ind., assignor of forty-nine percent to George Ronald Roux, Fort Wayne, Ind.

Application April 7, 1959, Serial No. 804,666

5 Claims. (Cl. 294—65.5)

The present invention relates to a magnetic retriever and particularly to a hand held magnetic retriever.

The primary object of the invention is to provide a magnetic retriever having means for releasing the retrieved material from the magnetic field.

Another object of the invention is to provide a retriever of the class described above having means for breaking the magnetic field while the retrieved material is engaged with the device.

A further object of the invention is to provide a magnetic retriever of the class described above having mechanical means for disengaging the retrieved material from the magnetic field.

Other objects and advantages will become apparent in the following specification when considered in light of the attached drawings, in which:

Figure 1 is a perspective view of the invention in extended position;

Figure 2 is a transverse section taken along the line 2—2 of Figure 1, looking in the direction of the arrows;

Figure 3 is a horizontal section taken along the line 3—3 of Figure 2, looking in the direction of the arrows; and Figure 4 is a view similar to Figure 2 with the parts in retracted position.

Referring now to the drawings in detail wherein like reference characters indicate like parts throughout the several figures, the reference numeral 10 indicates generally a magnetic retriever for picking up magnetically attractable materials such as iron filings, chips, and other small objects. In conventional structures wherein magnetizable material is retrieved directly on a permanent magnet, considerable difficulty is encountered in removing the retrieved material at a desired point of discharge. The retriever 10 is provided with means for mechanically disengaging the retrieved material from the magnetic field under the control of the operator.

The retriever 10 comprises a hollow body 11 having a bottom wall 12, a pair of spaced generally parallel side walls 13, 14 and a front wall 15. The front wall 15 extends between and integrally connects the side walls 13, 14 and extends perpendicularly upwardly from the bottom wall 12. A top wall 16 is releasably secured to the upper edge of the side walls 13, 14 and the front wall 15 and is provided with an integral perpendicularly extending rear wall 17. The rear wall 17 engages between the rear ends of the side walls 13, 14 and is secured to the bottom wall 12 by securing elements 18. The top wall 16 is releasably secured to the front wall 15 by securing elements 19.

The top wall 16 is provided with an elongated relatively narrow slot 20 opening therethrough. A pair of spaced parallel generally rectangular apertures 21 open through the front wall 15 in parallel relation to the bottom wall 12 and the top wall 16. The front wall 15 may be formed of the same material as the housing 11 or may be formed of a soft vinyl plastic, if desired.

A generally U-shaped carriage 22 is slidably arranged in the housing 11 and includes a leg 23 and a second leg 24 arranged in spaced parallel relation thereto. A bight 25 is integrally formed on the leg 23 extending toward the leg 24 and the leg 24 is secured thereto by an integral pin 26 maintaining the legs 23, 24 in spaced parallel relation.

The leg 24 has an elongated longitudinally extending slot 27 formed therein and arranged in aligned relation to the slot 20 in the top wall 16.

The legs 23, 24 have the ends thereof opposite the bight 25 inwardly rabbeted at 28, 29 to receive the inner ends respectively of ferrous metal bars 30, 31 which are also arranged in spaced parallel relation. The bars 30, 31 are secured to the legs 23, 24 by means of integral pins 32 formed on the legs 23, 24. The bars 30, 31 extend snugly through the generally rectangular slots 21 and are adapted to be reciprocated therethrough on movement of the carriage 22 in the housing 11. As can be best seen in Figure 4, the bars 30, 31 when in their fully retracted position, are recessed within the slots 21 a slight distance.

A generally rectangular Alnico bar magnet 33 is slidably positioned between the legs 23, 24 and is arranged to be positioned in contact with the bars 30, 31 in one position as illustrated in Figure 2, or spaced from the bars 30, 31 in another position, as illustrated in Figure 4. A block 34 is slidably mounted between the legs 23, 24 and is rigidly connected to the magnet 33 by means of securing elements 35. The block 34 has a shank 36 integrally formed thereon extending upwardly through the slot 27 and the slot 20. A knob 37 is secured to the upper end of the shank 36 by means of a securing element 38.

In the use and operation of the invention, the knob 37 is normally positioned as illustrated in Figure 2 with the bars 30, 31 protruding through the front wall 15. In this position the bars 30, 31 are in contact with the magnet 33 and attract ferrous metal materials into contact therewith. The retriever 10 is moved about so that the bars 30, 31 attract the desired quantity of material thereto, whereupon the retriever 10 is moved to a position overlying a discharge receptacle for the retrieved material. With the retriever 10 in this position, the knob 37 is moved toward the rear wall 17 disconnecting the magnet 33 from the bars 30, 31. The greater majority of the ferrous material will drop from the bars 30, 31 as soon as the magnet 33 disengages therefrom. However, continued movement of the knob 37 toward the rear wall 17 will draw the bars 30, 31 through the slots 21 so as to wipe residual ferrous material off of the bars 30, 31. The bars 30, 31 are again extended from the housing 11 so that additional ferrous material may be gathered thereon, as desired.

Having thus described the preferred embodiment of the invention, it should be understood that numerous structural modifications and adaptations may be resorted to without departing from the scope of the appended claims.

What is claimed is:

1. A magnetic retriever comprising a housing, a carriage slidably mounted in said housing, a pair of bars arranged in spaced parallel relation on said carriage with said bars slidably engaging through the front wall of said housing, said bars being formed of magnetically attractable material, a magnet slidably mounted in said carriage from a position engaging said bars to a position spaced from said bars, and means engaging said magnet engageable with said carriage for moving said magnet out of contact with said bars and moving said carriage to withdraw said bars through said front wall.

2. A device as claimed in claim 1 wherein said carriage comprises a pair of spaced parallel legs and a bight connecting said legs in spaced parallel relation, and said bars are respectively rigidly secured to said legs.

3. A device as claimed in claim 1 wherein the means connected to said magnet for moving said magnet comprises a block slidably positioned in said carriage and a shank extending outwardly from said block for engagement with said carriage.

4. A device as claimed in claim 1 wherein said front wall has a pair of spaced parallel generally rectangular slots formed therein through which said bars extend whereby on movement of said bars through said slots said front wall engages said bars with a wiping contact.

5. A device as claimed in claim 4 wherein said bars are of generally rectangular form and are rigidly secured to one end of said legs.

No references cited.